United States Patent
Joensuu et al.

(10) Patent No.: US 12,332,612 B2
(45) Date of Patent: Jun. 17, 2025

(54) METHOD AND SYSTEM FOR MONITORING A PROCESS

(71) Applicant: KEMIRA OYJ, Helsinki (FI)

(72) Inventors: Iiris Joensuu, Espoo (FI); Marjatta Piironen, Espoo (FI); Torsten Haverinen-Nielsen, Espoo (FI); Vesa-Matti Tikkala, Espoo (FI)

(73) Assignee: KEMIRA OYJ, Helsinki (FI)

( * ) Notice: Subject to any disclaimer, the term of this patent is extended or adjusted under 35 U.S.C. 154(b) by 152 days.

(21) Appl. No.: 17/769,062

(22) PCT Filed: Oct. 13, 2020

(86) PCT No.: PCT/FI2020/050677
§ 371 (c)(1),
(2) Date: Apr. 14, 2022

(87) PCT Pub. No.: WO2021/074491
PCT Pub. Date: Apr. 22, 2021

(65) Prior Publication Data
US 2024/0103456 A1   Mar. 28, 2024

(30) Foreign Application Priority Data
Oct. 16, 2019   (FI) .................................... 20195894

(51) Int. Cl.
*G05B 13/02* (2006.01)
*D21F 11/00* (2006.01)
*G05B 23/02* (2006.01)

(52) U.S. Cl.
CPC .......... *G05B 13/0265* (2013.01); *D21F 11/00* (2013.01); *G05B 23/024* (2013.01)

(58) Field of Classification Search
CPC ........ D21F 11/00; G06N 20/00; G06N 5/045; G05B 13/0265; G05B 23/024;
(Continued)

(56) References Cited

U.S. PATENT DOCUMENTS

2006/0085090 A1*  4/2006  Laitinen-Vellonen ...................... G05B 23/024
700/128
2008/0082181 A1*  4/2008  Miller ................ G05B 23/0245
700/30

(Continued)

OTHER PUBLICATIONS

International Search Report and Written Opinion mailed Feb. 25, 2021, from International Application No. PCT/FI2020/050677, 14 pages.

(Continued)

*Primary Examiner* — Kidest Bahta
(74) *Attorney, Agent, or Firm* — Meunier Carlin & Curfman LLC

(57) ABSTRACT

The invention provides a way to monitor a process (1). The invention utilizes explanation values. A ML model of the process is created. The ML model utilizes measurements from the process as inputs to the ML model and forms model outputs. The inputs are classified to groups in the. The explanation values are calculated for each input indicating contribution of the input to the model output/s, and a sum of the explanation values for each group are calculated. The calculated sums are monitored, each sum indicating status of the group in question.

25 Claims, 4 Drawing Sheets

Figure 1:
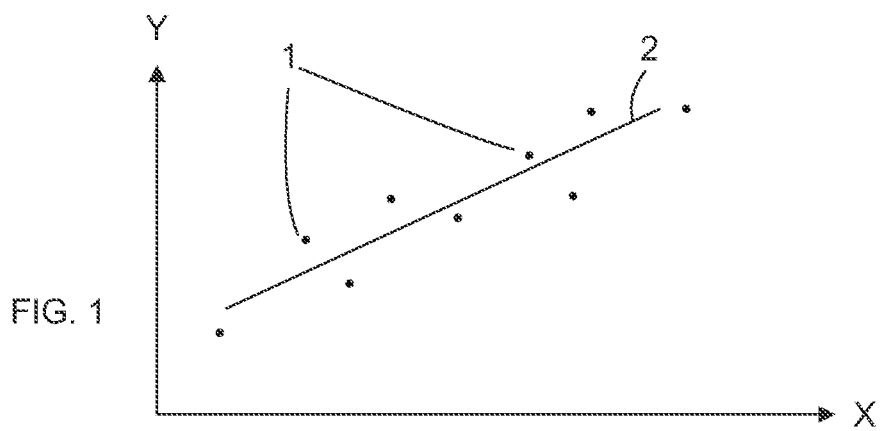

(58) Field of Classification Search
CPC ...... G05B 19/00; G05B 2219/00; G05B 9/00; G05B 11/00; G05B 15/00; G05B 13/00
See application file for complete search history.

(56) References Cited

U.S. PATENT DOCUMENTS

| | | | | |
|---|---|---|---|---|
| 2017/0060104 | A1* | 3/2017 | Genma | G05B 13/0265 |
| 2018/0284702 | A1* | 10/2018 | Sonoda | G05B 13/027 |
| 2019/0325333 | A1* | 10/2019 | Chan | G06F 18/2163 |
| 2020/0034665 | A1* | 1/2020 | Ghanta | G06F 17/18 |

OTHER PUBLICATIONS

Finnish Search Report dated May 19, 2020, issued in FI Application No. 20195894, 2 pages.

Nohara Yasunobu et al: "Explanation of Machine Learning Models Using Improved Shapley Additive Explanation", Computational Biology and Health Informatics, Sep. 4, 2019, p. 546.

Gil Fidel et al., "When Explainability Meets Adversarial Learning: Detecting Adversarial Examples using SHAP Signatures", Cornell University Library, Sep. 8, 2019.

Scott Lundberg et al., "A Unified Approach to Interpreting Model Predictions", Cornell University Library, May 22, 2017.

F. Senesoulin et al., "Estimation of Dominant Power Oscillation Mode using LSTM-RNN based on Synchrophasor Data", IEEE Industrial and Commercial Power Systems Europe (EEEIC I I&CPS Europe), Jun. 11, 2019 (Jun. 11, 2019), 6 pages.

Mattia Carletti et al., "Explainable Machine Learning in Industry 4.0: Evaluating Feature Importance in Anomaly Detection to Enable Root Cause Analysis", IEEE International Conference on Systems, Man and Cybernetics (SMC), Oct. 6-9, 2019, 6 pages.

Auret, L. et al. Empirical comparison of tree ensemble variable importance 1-24 measures. In: Chemometrics and Intelligent Laboratory Systems. ScienceDirect Elsevier (online], Dec. 29, 2010, vol. 105, No. 2, 157-170, (retrieved on Apr. 23, 2020]. Retrieved from <https ://www .sciencedi reet. com/science/article/pii/SO 1697 43910002315>, <DOI:10.1016/j.chemolab.2010.12.004> abstract; sections 2-4; figures 1, 7; tables 6-7.

Ribeiro, M. T. et al. "Why Should I Trust You?" Explaining the Predictions of 1-24 Any Classifier. In: arXiv (online], Aug. 9, 2016, (retrieved on May 14, 2020]. Retrieved from <https://arxiv.org/abs/1602.04938> the whole document.

Gunning, D. Explainable Artificial Intelligence (XAI). DARPA/120, (online], Nov. 1-24, 2017, (retrieved on May 8, 2020]. Retrieved from <https://www.darpa.mil/attachments/XAIProgramUpdate.pdf> the whole document.

Gilpin, L. H. et al. Explaining Explanations: An Overview of Interpretability of 1-24 Machine Learning. In: arXiv (online], Feb. 3, 2019, (retrieved on May 15, 2020]. Retrieved from <https://arxiv.org/abs/1806.00069> the whole document.

Guidotti, R. et al. A Survey Of Methods For Explaining Black Box Models. In: 1-24 arXiv (online], Jun. 21, 2018, (retrieved on May 15, 2020]. Retrieved from <https://arxiv.org/abs/1802.01933> the whole document.

* cited by examiner

| Variables | Main group | Subgroup 1 | Subgroup 2 | Subgroup 3 | Subgroup 4 | Subgroup 5 | Subgroup 6 |
|---|---|---|---|---|---|---|---|
| 1 | | | | | | | |
| 2 | x | | | | | | x |
| 3 | x | | | | | | x |
| 4 | x | x | | | | | |
| 5 | x | x | x | | | | |
| 6 | x | x | x | | | | |
| 7 | x | x | x | | | | |
| 8 | x | x | | | | x | |
| 9 | x | x | | x | | | |
| 10 | x | x | | x | | | |
| 11 | x | x | | x | | | |
| 12 | x | x | | x | | | |
| 13 | x | x | | | x | | |
| 14 | x | x | | | | x | |
| 15 | x | x | | | x | | |
| 16 | x | | | | | | |
| 17 | x | | | | | | |
| 18 | x | | | | | | |
| 19 | x | | | | | | |
| 20 | | | | | | | |

FIG. 7

METHOD AND SYSTEM FOR MONITORING A PROCESS

CROSS REFERENCE TO RELATED APPLICATIONS

This application is a United States National Phase Patent Application of International Patent Application Number PCT/FI2020/050677, filed on Oct. 13, 2020, which claims the benefit of priority to Finnish Application No. 20195894 filed on Oct. 16, 2019, both of which are incorporated by reference herein in their entirety.

FIELD OF TECHNOLOGY

The invention relates to monitoring of a process. The process is, for example, a water treatment plant, a paper machine etc.

Prior Art

Nowadays machine learning algorithms are used with systems, which model, analyze and estimate behavior of a process like a paper machine or a water treatment.

Processes are usually multivariable processes so a great number of measurements are taken, and the processes can be very difficult to monitor or understand. Huge amount of data is generated and processed especially when measurements are obtained online and every day.

Machine learning provides systems the ability to automatically learn and also to improve from experience without being explicitly programmed. So, machine learning (ML) utilities algorithms and statistical models that computer systems use to perform a specific task or tasks without using explicit instructions. There exist several ML algorithms. Here only some of them are mentioned: linear regression, logistic regression, Kmeans, feed-forward neural networks etc.

The outcomes of the ML algorithms are usually difficult to interpret, especially from complex processes. Therefore, explanation values are used to help user to interpret the outcomes of the ML. The explanation values are obtained by using, for example, SHAP (Shapley additive explanations) values, LIME method or DeepLIFT method.

There is still need to identify source or origin of process disturbances, monitoring thereof.

Short Description

The object of the invention is to provide a way to monitor a process. Another object of the invention is to provide a method to identify, optionally assess, source(s) of process disturbances or quality defects in a process. Still another object of the invention is a method to control the process using the information on the source/origin of disturbances. The invention utilizes explanation values. Monitoring of the process can be done automatically. The object is achieved in a way described in the independent claim. Dependent claims illustrate different embodiments of the invention.

An inventive method for monitoring a process and/or identifying source(s) of process disturbances or source(s) of quality defects comprising a pre-step for creating a ML model of the process. The ML model utilizes measurements from the process as inputs to the ML model and forms model outputs. The method further comprises a second pre-step for classifying the inputs to groups. This can be done utilizing a predetermined database containing info about how the inputs belong to the groups. The method has a calculation step for calculating an explanation value for each input indicating contribution of the input to the model output/s, and for calculating a sum of indication values for each group, the indication values relating to the explanation values. Further, the method comprises a monitoring step for monitoring the calculated sums, each sum indicating status of the group in question. The monitoring can be made in a group specific way. The groups may comprise main groups and subgroups in the main groups. Output(s) of the method may be used for manual or automatic control of the process or sub-processes of the process.

LIST OF FIGS

Figure 2:
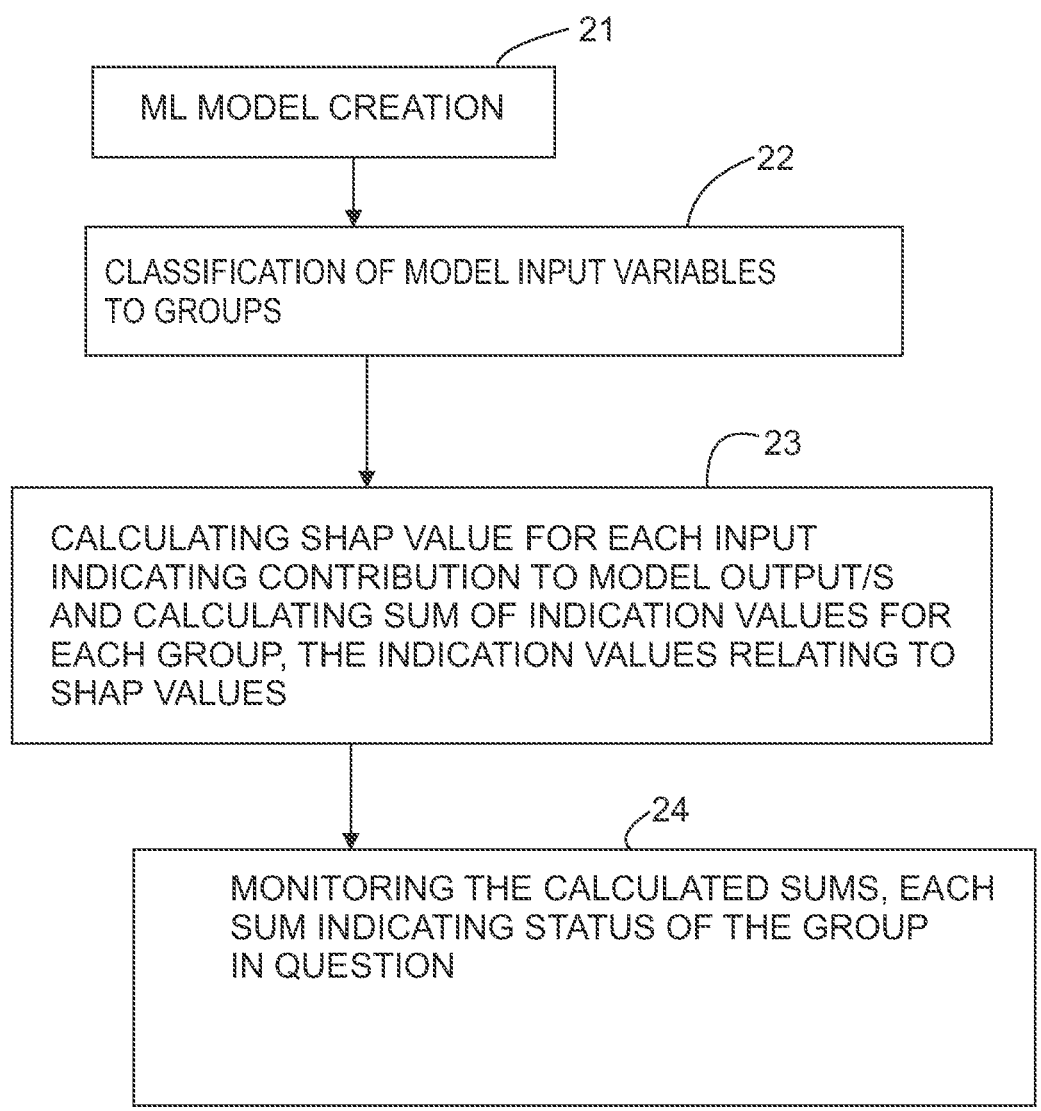
Figure 3:
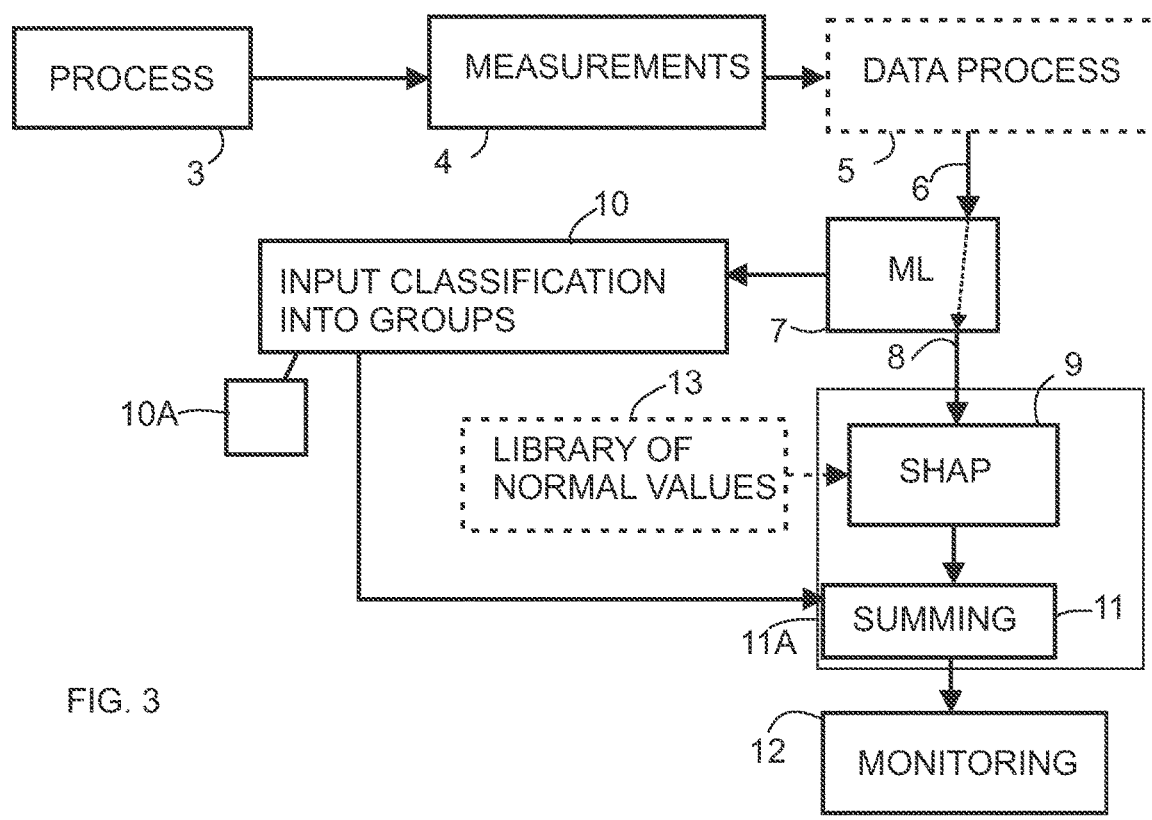
Figure 4:
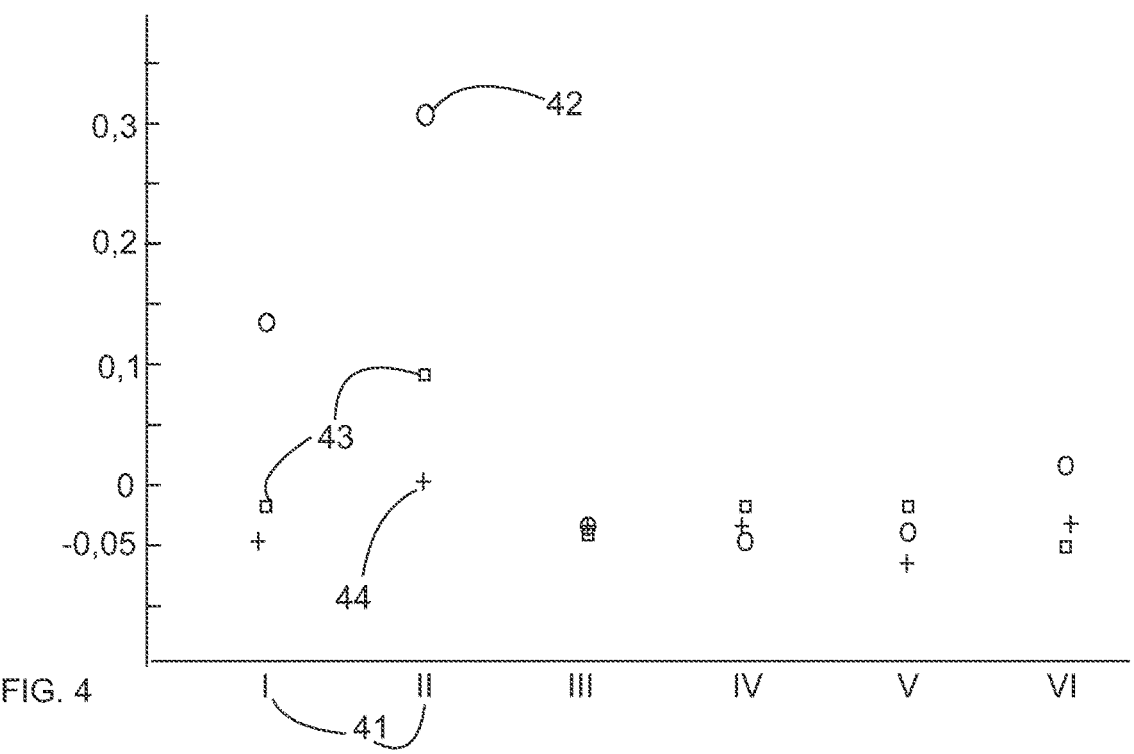
Figure 5:
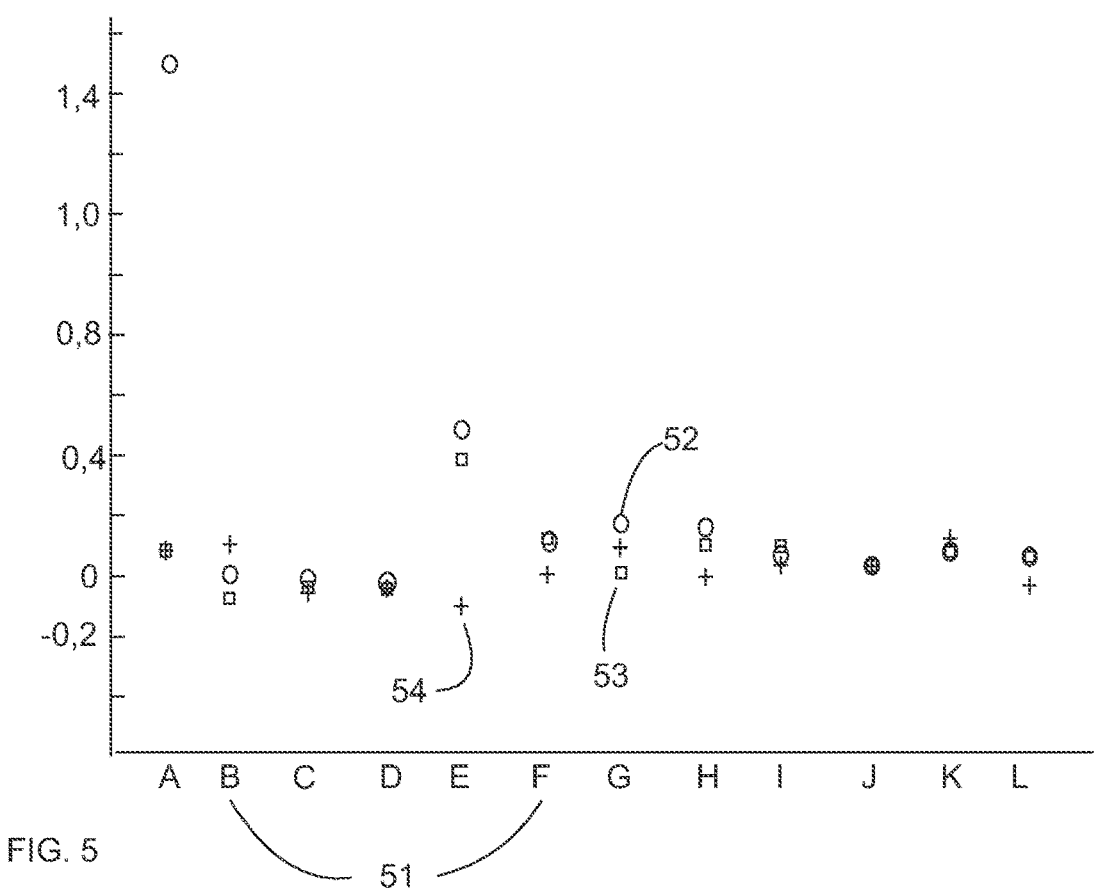

In the following, the invention is described in more detail by reference to the enclosed drawings, where FIG. 1 shows a simple example of ML modelling for illustration purposes, FIG. 2 illustrates a flow chart example of the method according to the invention, FIG. 3 illustrates an example of a system according to the invention, FIG. 4 illustrates an example of calculated sums for main groups of inputs according to the invention, FIG. 5 illustrates an example of calculated sums for sub groups of the main groups according to the invention.

Figure 6:
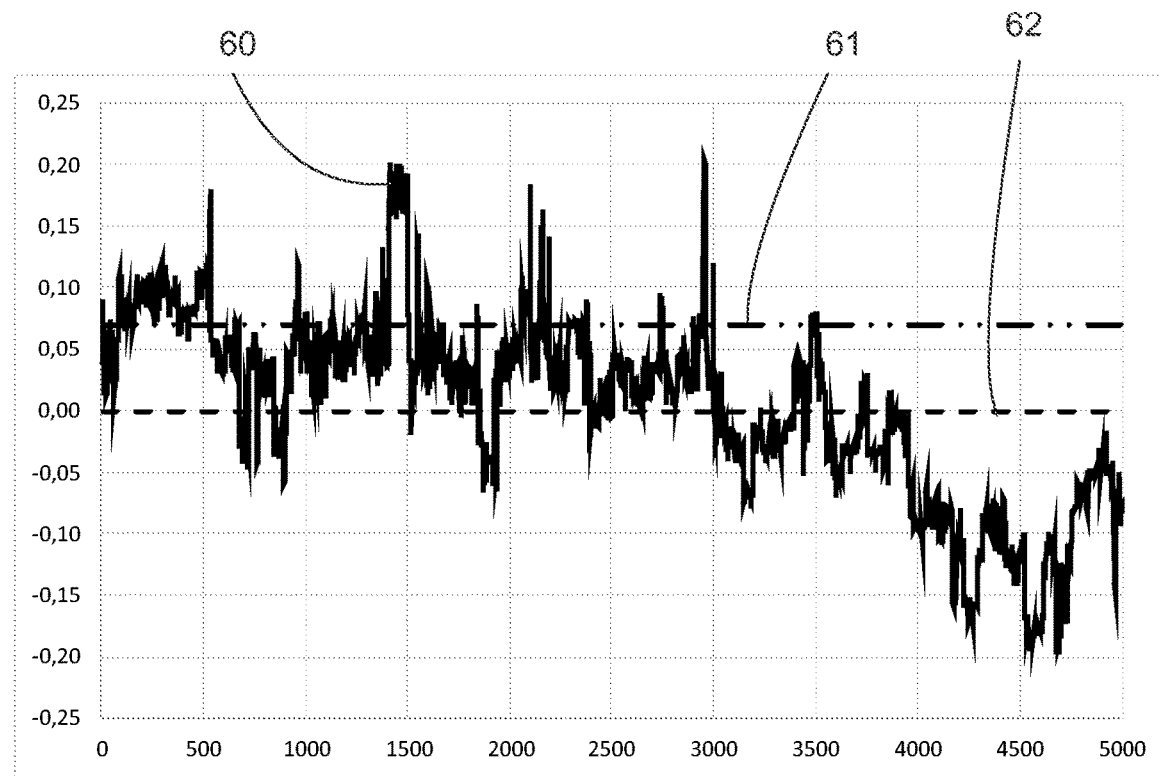

FIG. 6 illustrates an example of a sum of SHAP values calculated for a chemistry group with warning and alert thresholds (lower and higher horizontal lines, respectively) and FIG. 7 illustrates an example of grouping inputs into a main group and subgroups.

DESCRIPTION OF THE INVENTION

FIG. 1 illustrates a simple example of ML modelling for illustration purposes. Real models can be much more complex and comprises a great number of variables. In FIG. 1 the X-axis illustrates a variable, for example power supplied to a reel of a paper machine. The Y-axis illustrates another variable, for example a rotating speed of the reel. This simple example models the relationship between these variables. As the power supply increases, the rotation speed increases also. Points 1 are measured rotation points, and the corresponding X-axis indicate measured power supplies. Another example could be that the X-axis illustrates the amount of hydrophobic contaminants in wire water of a paper machine, and the Y-axis washing interval of the machine.

As can be seen the measurements can be modelled as an increasing line 2. The values of the line are means values of the real measurements. In an equation form the line can be $y=Ax+B$. The line and its equation can be a simple ML model for relationship between two variables. As said real processes are usually much more complex so ML models are also more complex in real. It is easy to see how power affects to the rotating speed in the example of FIG. 1, so an explanation value is not so useful. But the situation is much more difficult to understand if there are more variables, for example ten variables, how each variable contributes to the output/s of the model.

Although, in this text a process is referred as one process, it can comprise many different processes, which perform together the whole process. So, the process in this description can actually comprise several processes and sub-processes. For example, a paper machine process may have one or more sub-processes, e.g. one or more of water circulation, wet end and broke line etc. A waste water treatment process may comprise e.g. primary, secondary and tertiary treatments, or some of those. Similarly, the ML model of the whole process may comprise several models, which may be called as sub models also. Therefore, there can be several outputs of the whole ML model (i.e. output of the submodels). Each output simulates/predicts a certain property of the process.

Process can be an industrial process. The process can be for example pulp process, papermaking, boardmaking or tissuemaking process, paper machine, pulp mill, tissue machine, board machine, water treatment process, waste water treatment process, raw water treatment process, water re-use process, industrial water treatment process, municipal water or waste water treatment process, sludge treatment process, mining process, oil recovery process or any other industrial process.

Sub-processes and model output(s) can be suitably selected depending on the process in question.

Now, in the invention it has been discovered that the explanation values of machine learning, e.g. SHAP values can be utilized in order to monitor the process. In the text the examples refer to the SHAP values, but the examples can also utilize values from the LIME method, values from the deepLIFT method or any other possible explanation values. The SHAP (SHapley Additive exPlanation) explanation values attribute to each feature the change in the expected model prediction when conditioning on that feature. The values explain how to get from a base value an expectation $E[f(z)]$ that is going to be predicted if we did not know any features to the current output $f(x)$. The order how features are added in the expectations matters. However, this is taken into account in SHAP values.

The LIME method interprets individual model predictions, which are based on locally approximation the model around a given prediction. LIME refers to simplified inputs x
    as interpretable inputs. The mapping $x=hx(x)$ converts a binary vector of interpretable inputs into the original input space. Different types of hx mappings are used for different input spaces.

DeepLIFT is a recursive prediction explanation method. It attributes to each input $xi$ a value $C\Delta xi\Delta y$ that represents the effect of that input being set to a reference value as opposed to its original value. It means that DeepLIFT mapping $x=hx(x)$ converts binary values into the original inputs, where 1 indicates that an input takes its original value, and 0 indicates that it takes the reference value. The reference value represents a typical uninformative background value for the feature.

The SHAP values (or other explanation values of machine learning) are calculated for each input indicating contribution of the input to the model output/s. For example, when considering a headbox of a paper machine a fun pump speed and pH value of the pulp may be inputs to a submodel and the SHAP values for them are calculated. Another part of the paper machine may be modelled by another submodel using other inputs like wire speed of a wire of the machine. Now when the inputs for the model of the whole process and/or inputs for the model of the sub-process are classified to groups, and utilizing the SHAP values calculated to the model output/s, and calculating the sum of the SHAP values for each group, it is possible to monitor contribution of a group of inputs to the model output.

The classification of the input into the groups is a pre-step. It utilizes a predetermined database containing info about how the inputs belong to the groups. The knowledge how the inputs could be grouped is expert knowledge of the process in question. In many cases expert knowledge may include experience and process knowledge such as chemistry knowledge, chemistry related phenomena knowledge. The expert knowledge can be in the form lists, charts, tables or other forms, which are used to provide said predetermined database. So, the database can be in the form of list/s, chart/s or table/s, for example. As can be seen the database contains the expert knowledge. The predetermined databases as such can be made in any known manners. Data analysis of history data can be used when forming the databases.

Another example can be that output of sub-model for broke line is the amount of detrimental contaminants. Inputs of this sub-models can be e.g. volume or mass flows of uncoated and coated broke, anionic charge, the count of colloids. The outputs of another exemplary sub-model may be e.g. the amount of detrimental compounds from water circulation and pulp processes or the quality of raw water. The output of the whole process model may be e.g. runnability of paper machine (e.g. breaks) or the certain quality of final product, e.g. defects (e.g. spots, holes), strength, sizing performance, edge wicking, formation, spore count, count of microbes, certain water quality parameter in a water treatment process or any suitable target parameter of a process in question. A defect may be for example a defect in paper or board quality, defects such as spots or holes, defects in strength, sizing performance, edge wicking, formation, spore count or count of microbes. Defects in e.g. strength or in other defects means for example that the value describing a defect does not meet a target value. For example, defects in strength may mean that strength value is too low or uneven/varying with time.

FIG. 2 shows an example of the inventive method. A method for monitoring a process and/or identifying source (s) of process disturbances or quality defects comprises a pre-step 21 for creating a ML model of a process. History data can be used for training of the model (e.g. 1-2 years data). Pre step can be done once or at certain intervals (regular e.g. once per year) or irregular based on need. As said the process may have several processes (sub processes). The ML model utilizes measurements from the process as inputs to the ML model and forms model outputs. See FIG. 3. So, the model outputs of the ML model or models express how the process runs as described above. This is known as such. The method further comprises a second prestep 22 for classifying the inputs to groups utilizing a predetermined database. The groups may comprise main groups and optionally subgroups in the main groups. The groups are pre-defined, for example by users or owners of the process. Groups can reflect preidentified quality indexes and/or process conditions. A group may comprise one or more inputs, and an input may be included into one or more groups.

Measurements from a process can be e.g. chemistry related measurements (such as pH, redox, conductivity, charge, cationic demand, concentration of wood extractives, turbidity, phosphorus, phosphate, chemical oxygen demand, total solids, suspended solids), which measurements may be real time, continuous or laboratory measurements, dosing amount of chemicals, flow rate of chemicals to be dosed to the process, flow rates and consistencies of water and pulp streams, production information (e.g. grade, grammage, produced tons of product, machine speed, breaks, the type of breaks), filling level of towers and tanks, process delays, measurements of product quality (like defects, strength, Cobb value). Relevant/suitable measurements depend on the process in question and can comprise any relevant/suitable measurements of that process.

The model has a calculation step 23 for calculating explanation value of machine learning (explanation value), e.g. a SHAP value for each input indicating contribution of the input to the model output/s, and calculating a sum of indication values for each group. The calculation step can be typically done at regular time frequency e.g. every minute, every 10 minutes, every 60 minutes. It should be noted that the explanation values are calculated for all inputs of the known ML model/s. In addition, the invention calculates specific sums of the explanation values for said predetermined groups. So, the indication values relate to the explanation values, e.g. SHAP values. The indication values are explanation values, e.g. SHAP values or explanation deviations values, e.g. SHAP deviations values. The explanation deviations values, e.g. SHAP deviation values are differences between the explanation values, e.g. SHAP values and normal explanation values, e.g. SHAP values. The normal values can be obtained from good running periods of the process. So, it can be said that the normal explanation values (e.g. normal SHAP values) are explanation values (e.g. SHAP values) for a stable process (no disturbances in runnability or in quality of end product). Further, the method comprises a monitoring step 24 for monitoring the calculated sums, each sum indicating status of the group in question. The inputs can be real time values, the monitoring may be real time as well. The invention can also be used for other analysing purposes. For example, the inputs may be historical data which is used for analysis.

The monitoring step may define status for each group of inputs. The groups are made such that they relate to group specific item. In other words, the inputs of the group relate to the specific item. The sum of SHAP values or the SHAP values themselves (or other explanation values) can be scaled to a suitable level, which is convenient to use. For example, the status of the group is fine when the sum is negative or relatively near to zero, i.e. the model and the process runs fine. On the other hand, the status of the group is not fine when the sum is positive, i.e. the process has a problem or problems or the risk for process issues/disturbances increases. So, the sum of the explanation values calculated to a specific group is designed to determine a certain condition or conditions of the process. The scaling of the sum can be made in many ways, here the zero or negative value indicates a proper condition. The interpretation/meaning of the calculated sum has been made to be easy.

It should be noted that the Interpretation/meaning of the sum depends on each individual group. For example, if the interpretation/meaning of the group is to indicate e.g. paper strength then high strength values (high sums) are good and low strength values (low sums) are bad. Interpretation of the explanation values are now different than in the example above. When the sum is negative, the status of the group is not fine (contributors decreases strength). When the sum is positive, the status of the group is fine (contributors increases strength).

So, the monitoring the calculated sums, each sum indicating status of the group in question is made in a group specific way.

The status of the group may be indicated in a suitable way, e.g. as "traffic lights": green, yellow and red. If the status of the group is green, the contribution of the group to the model output is low (i.e. low or decreased risk for process instability, disturbances or issues or poor product quality). The green status means that the status of this group is good. If the status of a group is yellow, the contribution of the group to the model output is moderate (i.e. the risk for process instability, disturbances or issues or poor product quality has increased). The yellow status means that the status of this group is no more good or at an acceptable level. The yellow status may be called warning status. If the status is red, the contribution of the group to the model output is high (i.e. the risk for process instability, disturbances or issues or poor product quality is high). The red status may be called alert status. The status of the group may also be e.g. numeric values (e.g. 0, 1, 2, 3) or text value (good, warning, alert). The status of a group may be defined based on predefined threshold values for sum of SHAP values (or other explanation values). Pre-defined threshold values may depend on the model, process and measurements values used as an input in the model. Pre-defined threshold values may by defined on the basis of history data of the process.

The classification of the inputs is conveniently made to have main groups and subgroups. As said the classification utilizes the predetermined database. FIG. 4 shows an example of the main groups 41, i.e. I, II, Ill, IV, V, VI. The vertical axis shows a sum of the SHAP values of each group. Let's think that the process to be monitored is a paper making process, and the main groups are production I, chemistry II, towers in subprocess 1 III, towers in subprocess 2 IV, breaks V and others VI. Circles 42, rectangles 43 and crosses 44 show different situations, so FIG. 4 shows three examples in fact. These examples have real basis from real paper making. The circles show a situation where there are >500 quality defects on a paper reel. The rectangles show a situation where there are 50 to 500 quality defects on a paper reel, and the crosses show a situation where there <50 quality defects on a paper reel. As can be seen, the crosses are relatively near zero or zero, which indicates that the situation is fine in every group. The defects are in an acceptable level. The situation is not so good within the rectangles, since it can be seen that the sum value is above zero in the chemistry group. So, the monitoring indicates that something could be done in this group i.e. with inputs and process/es whereto the inputs relate. The circles indicate that the situation is now even worse in the chemistry group and also in the production. So, as can be noted, the level of the sum value may also indicate the seriousness of the defects. For example, when referring to FIG. 4, the sum value below a threshold value of 0.05 indicates that situation is fine, so the number of defects is small and they do not affect very much the process. The sum value between the threshold values 0.05 to 0.15 indicate that something is wrong in the process, the process may be becoming instable, i.e. risk for process disturbances may be increasing but any immediate actions are not needed yet. The rectangle situation has an indication of this level in the group II, and the circle situation has also an indication in the group I at this level in FIG. 4. The sum value above a threshold value of 0.15 indicates that an immediate action/s is required, so the defects of this level are the most serious defects. The circle situation has the indication of this level in group II. The threshold values for a status of a group are predefined and may depend e.g. on one or more of the model, process and measurements values used as an input in the model.

Main groups of the process or sub-process may be chemistry (chemistry related measurements of the process or sub process, respectively), production (production related measurements of the process or sub process, respectively), the quality of product, towers and/or any other suitable groups. Examples of the sub-groups of the chemistry group are dissolved compounds, particles, hydrophobic particles, microbial activity, organic compounds, inorganic compounds or chemistry (e.g. pH, temperature, conductivity, any other measurements relating to the chemistry state of the process) in a specific water or pulp or filtrate stream in the process or sub process, or in a specific chemical treatment step in the process or sub process. Examples of the subgroups of the production are grade, grammage, the amount of produced product, breaks/shutdowns of the process, the volume of treated water, the flow of treated water. For example, if the process is paper or board machine, subgroups for chemistry can be the quality of incoming pulp(s), anionic trash in incoming pulp(s), microbial activity in incoming pulp(s), hydrophobic contaminants in incoming pulp(s), wet end chemistry, microbial activity in wet end, anionic trash (amount or concentration of dissolved anionic compounds) in wet end, hydrophobic contaminants in wet end, retention, sizing, the quality of broke stream(s), hydrophobic contaminants in broke stream(s), microbial activity in broke stream(s), anionic trash in broke stream(s), the quality of raw water, the quality of water circulation. The predefinition of groups can depend on the process and the model (target value of the model).

For example, the process can be a paper, board or tissue making process, and the main groups comprise one or more of production, chemistry, towers, and others.

Because the main groups are relatively large, they may give right direction/s to do corrective actions, but subgroups of the main groups can give more accurate direction/s. Although, the use of the main groups and the subgroups has some advantages, it is also possible to use the group classification without the main groups and the subgroups as already said. In this kind of embodiments, the inputs are just classified to groups.

FIG. 5 shows an example of the subgroups 51 i.e. A, B, C, D, E, F, G, H, I, J, K and L. The vertical axis shows a sum of the SHAP values of each subgroup. Let's think that the process to be monitored is the same paper making process as in FIG. 4, and the subgroups belong to the chemistry main group II. The subgroups may be retention, hydrophobic contaminants, agglomeration, anionic trash, pulp quality, sizing, raw water, waste water, microbial activity, defoamer, furnish temperature and furnish pH. The circles 52 relate to the situation of the circles in FIG. 4. The rectangles 53 relate to the situation of the rectangles in FIG. 4, and the crosses 54 relate to the situation of the crosses in FIG. 4. As can be seen the situation is fine with crosses. Some problems occur with pulp quality in the situation of the rectangles. And there are problems with retention and pulp quality in the situation of the circles. The level of the sum value can also indicate the seriousness of the defects in the subgroups.

Further, the subgroups can comprise one or more of quality of incoming pulp(s), anionic trash in incoming pulp(s), hydrophobic contaminants in incoming pulp(s), microbial activity in incoming pulp(s), wet end chemistry, microbial activity in wet end, anionic trash (amount or concentration of dissolved anionic compounds) in wet end, hydrophobic contaminants in wet end, retention, sizing, the quality of broke stream(s), hydrophobic contaminants in broke stream(s), anionic trash in broke stream, microbial activity in broke stream(s), the quality of raw water, the quality of water circulation, grade, grammage, the amount of produced product, breaks/shutdowns of the process.

FIG. 3 shows an example of the inventive system to monitor a process. The system comprises a ML module 7 in order to create a ML model of the process. The ML model utilizes measurements 4 from the process 3 as inputs 6 to the ML model and forms model outputs 8. It is practical that measurements 4 are pre-processed 5 before used as inputs in the ML modelling. The pre-processing may, for example, comprise data merging, data filtering, aligning time format, modifying metadata, data validation etc.

The system further comprises a classification module 10 in order to classify the inputs to main groups and subgroups in the main groups. As said, the classification of the input into the groups is a pre-step. It utilizes a predetermined database containing info about how the inputs belong to the groups. The knowledge how the inputs could be grouped is expert knowledge of the process in question. Many cases experience and other process knowledge involve the expert knowledge. The expert knowledge can be in the form lists, charts, tables or other forms, which are used to provide said predetermined database. So, the database can be in the form of list/s, chart/s or table/s, for example. As can be seen the database contains the expert knowledge. So, the classification module utilizes a predetermined database containing info about how the inputs belong to the groups, The system has also a calculation module 11A in order to calculate a SHAP value for each input indicating contribution of the input to the model output/s 8 and to calculate a sum of indication values for each group. The indication values relate to the SHAP values. The calculation module 11A may comprises different units for these calculations i.e. a SHAP calculation unit 9, and a summation unit 11. In addition, the system comprises a monitoring module 12 to monitor the calculated sums, each sum indicating status of the group in question. Note that when calculating the SHAP values, the inputs 6 are used, which is for clarification illustrated as a dashed line from input 6 of the ML model to the SHAP module.

The classification module (10) in order to classify the inputs to groups can be arranged to utilize a predetermined database containing info about how the inputs belong to the groups, and the monitoring module (12) can be arranged to monitor the calculated sums in a group specific way.

As already said the indication values are SHAP values or SHAP deviations values. The SHAP deviation values are differences between the SHAP values and normal SHAP values. The normal values can be obtained from good running periods of the process and they can be kept in memory. So, the system can also comprise a library module 13 to keep the normal SHAP values, which can be used by the SHAP calculation module 9. As said, instead of the SHAP values other explanation values can be used.

As said the groups can be pre-defined, and status of the group in an embodiment is fine (acceptable) when the sum is negative or relatively near to zero, when a number of possible defects is small and the situation is at an acceptable range. The status of the group is not fine when the sum is positive. The sum may also indicate how serious the status is. The greater the sum is the more serious the situation is in the group. See above the example of the different levels of the sum relating to FIG. 4. Monitoring can be real-time when using real-time values as the inputs.

FIG. 6 shows an example of a chemistry group status with predefined threshold values 61, 62 as a function of time (x-axis indicating hours). In this example the status of the group is fine when the sum of SHAP values 60 (or other explanation values) is equal or below the threshold value of zero 62. Thus, when the status of the group is fine, this group does not increase the risk for process disturbances or quality defects in end product of the process. The status of the chemistry group is at warning level when the sum is above zero and equal to or less than the other threshold 61 value of 0.07. At this level the risk for process disturbances or quality defects in end product of the process has increased and preparations for corrective actions should be started. The status of the chemistry group is at alert level when the sum of SHAP values is above 0.07 i.e the other threshold value 61. When the threshold value is at the alert level, there is a high risk for process disturbances or quality defects in end product of the process. When the status of a group is at alert level, corrective actions are needed immediately. The end product may be e.g. an end product of an industrial process. The end product can be e.g. paper, board or tissue paper of respective process, or e.g. purified water from a water treatment plant or unit. So, as can be seen from the examples the status of the group can be defined utilizing at least one threshold value for said sums.

User may predefine threshold values for sum of explanation values, e.g. SHAP values for groups or sub-groups. Threshold values can be used for indicating the status of each group or subgroup and indicating the need of actions. The method may contain also a predefined action proposal (s) for each group or subgroup. If the sum of SHAP values of group or sub-group exceeds the pre-defined thresholds value for warning or alerting, the method gives an action proposal e.g. increasing or decreasing chemical dosages or the flow rates of pulp, filtrates or water streams, decreasing or increasing process temperature, decreasing or increasing pH in a process stream, activating the chemical dosing or deactivating chemical dosing. The sum of SHAP values of group or sub-group may be used for manual or automatic process control, e.g. controlling chemical dosing, process flows, pH, temperature etc.

The status of one of more of the groups and/or the sum of explanation values of one of more of the groups can be used for the automatic or manual controlling the process, troubleshooting of the process or optimization of the process. Controlling and or optimizing of the process can comprise one or more of dosing amount of chemicals, dosing point of chemicals, selection of chemical types to be used in the process.

So, the method and system according to the invention can comprise at least one next step for providing an action proposal for corrective actions based on the status of one of more of the groups.

So, the method and system according to the invention can comprise at least one next step for controlling, optimizing or troubleshooting the process based on the status of one of more of the groups. The controlling and/or optimizing step according to the invention can comprise one or more of controlling dosing amount of chemicals, dosing points of chemicals, dosing intervals of chemicals, selection of chemical types to be used in the process, process conditions, such as pH, temperature, flow rate of process streams, and process stream delays, such as pulp, broke or water stream delays in process equipment, such as in towers, tanks, pulpers, basins or other process equipment.

The method can also be used for predicting the risk for process disturbances, runnability and quality issues in end product e.g. for next hours or days.

The invention makes it possible to monitor a complex process, which would be very tedious to arranged by known ways. The monitoring can be done in two levels, and it does not affect existing ML models. Since the input variables are classified to the groups or to the main groups and the subgroups, it is also possible to change entities to be monitored by changing the classification, or even to use interleaved classifications. This means that the way how the inputs belong to the groups can be changed based on expert knowledge. The expert/s of the process may notice that there changes in the process, which must be taken into account, by changing the grouping of the inputs or creating a new group/s. The changed group/s or the new group/s can be inserted into the database. So, the predetermined database can be updated. So, the inventive monitoring method and system is flexible. The monitoring can be made automatically.

FIG. 7 also illustrates an example how the inputs (variables) can be put into a main group and subgroups. Let's consider that the ML model utilizes 20 inputs. The explanation values, like the SHAP values, are calculated in a known way for explaining the output of ML model. In addition to this the invention has also the predetermined groups, in the example of FIG. 7 one main group and six subgroup. The groups and the variables are in the table form in FIG. 7, but in real solution the same info is in the database in some data format. This info contains expert knowledge as said before. In FIG. 7 the inputs/variables 2-19 belong to the main group and the calculated explanation values for these inputs are summed. The sum indicates a certain condition of the process, like a generic fault situation, or another condition. The input 1 and 20 are not needed for this indication.

The inputs/variables 4-1 belong to the subgroup 1 and the calculated explanation values for these inputs are summed. Again, the sum indicates a certain condition of the process, like a more specific fault situation, or another more specific condition. Similarly, certain inputs belong to the other subgroups 2-6 indicating certain conditions or faults.

It should be noted that the explanation values are calculated for all inputs of the known ML model/s. In addition, the invention calculates specific sums of the explanation values for said predetermined groups. The benefit of the invention is clear. The existing explanation values (like the SHAP values) can be used for indication a certain conditions or faults by utilizing the predetermined groups of inputs for the ML model. Since the predetermined groups are based on expert knowledge they can also be updated if needed. The forming the predetermined groups are also flexible. There is no need to change the ML model or models, or to create new ML models.

When using the difference values of the SHAP values, the monitoring system could focus even better to the inputs variables which indicate problematic events in the process than using the SHAP values.

The invention can be implemented as software or as special integrated circuits, or as combination of software and hardware. The module 13 having the normal values is a memory, which naturally can comprise software and hardware. The inputs are measurements from the process. The ML model/s and the explanation values are calculated in known way as such. Further, the classification of the inputs into the predetermined groups and calculating the sum of the explanation values for the inputs of the groups, and each sum indicating status of the group in question in a group specific way performs a versatile arrangement to monitor different conditions of the process.

The inventive arrangement can be located to the same place as the process that is monitored. However, it is also possible that it is located to another place, which makes it possible to remotely monitor the process. For example, the measurement data 4 are sent through a communication network/s to the inventive monitoring, which handles the measurement data and provides process status data as output/s of the monitoring, which can used for many purposes like recommendations to adjust the process.

It is evident from the above that the invention is not limited to the embodiments described in this text but can be implemented utilizing many other different embodiments within the scope of the independent claims.

The invention claimed is:

1. A method for monitoring a process and/or identifying source(s) of process disturbances or quality defects comprising:
creating a machine learning (ML) model of the process, which ML model utilizes measurements from the process as inputs to the ML model and forms model outputs, and classifying the inputs to groups,
calculating an explanation value of machine learning for each input indicating contribution of the input to the model output/s, and calculating a sum of indication values for each group, the indication values relating to the explanation value of machine learning,
monitoring the calculated sums, each sum indicating status of the group in question, and
controlling, optimizing and/or troubleshooting the process based on the status of one of more of the groups.

2. The method according to claim 1, wherein classifying the inputs to groups utilizes a predetermined database containing info about how the inputs belong to the groups, and monitoring the calculated sums is made in a group specific way.

3. The method according to claim 1 wherein the explanation value of machine learning is a Shapley additive explanations (SHAP) value, a value from a local interpretable model-agnostic explanations (LIME) method, a value from a Deep Learning Important FeaTures (deepLIFT) method.

4. The method according to claim 3, wherein the groups comprise one or more of main groups and optionally one or more of subgroups.

5. The method according to claim 1 wherein the indication values are explanation values of machine learning or deviations of the explanation values, the deviations of the explanation values being differences between the explanation values and normal explanation values.

6. The method according to claim 5, wherein the groups are pre-defined.

7. The method according to claim 6, wherein the status of the group is defined utilizing at least one threshold value for said sums.

8. The method according to claim 7, wherein the status of the group is fine when the sum is negative or relatively near to zero, and the status of the group is not fine when the sum is positive.

9. The method according to claim 1, wherein the process is a pulp process, papermaking process, board making process, tissue making process, paper machine, pulp mill, tissue machine, board machine, water treatment process, waste water treatment process, raw water treatment process, water re-use process, any industrial water treatment process, municipal water, municipal waste water treatment process, sludge treatment process, mining process, or oil recovery process-or any other industrial process.

10. The method according to claim 4, wherein the process is a paper, board or tissue making process, and the main groups comprise one or more of production, chemistry, or towers.

11. The method according to claim 10, wherein the subgroups comprise one or more of quality of incoming pulp(s), anionic trash in incoming pulp(s), hydrophobic contaminants in incoming pulp(s), microbial activity in incoming pulp(s), wet end chemistry, microbial activity in wet end, anionic trash (amount or concentration of dissolved anionic compounds) in wet end, hydrophobic contaminants in wet end, retention, sizing, the quality of broke stream(s), hydrophobic contaminants in broke stream(s), anionic trash in broke stream(s), microbial activity in broke stream(s), the quality of raw water, the quality of water circulation, grade, grammage, the amount of produced product, breaks/shutdowns of the process.

12. The method according to claim 1, wherein the method comprises at least one next step for providing an action proposal for corrective actions based on the status of one of more of the groups.

13. The method according to claim 1, wherein the controlling and/or optimizing step comprises one or more of controlling dosing amount of chemicals, dosing points of chemicals, dosing intervals of chemicals, selection of chemical types to be used in the process, process conditions, such as pH, temperature, flow rate of process streams, and process stream delays, such as pulp, broke or water stream delays in process equipment, such as in towers, tanks, pulpers, basins or process equipment.

14. The method according to claim 1, wherein the inputs comprise real time values.

15. A system to monitor a process comprising a machine learning (ML) module in order to create a ML model of the process, which ML model utilizes measurements from the process as inputs to the ML model and forms model outputs, wherein the system further comprises a classification module in order to classify the inputs to groups,
a calculation module in order to calculate explanation value of machine learning for each input indicating contribution of the input to the model output/s, and calculating a sum of indication values for each group, the indication values relating to the explanation values of machine learning and
a monitoring module to monitor the calculated sums, each sum indicating status of the group in question, and
wherein the system is configured to control, optimize and/or troubleshoot the process based on the status of one of more of the groups.

16. The system according to claim 15, wherein the classification module in order to classify the inputs to groups utilizes a predetermined database containing info about how the inputs belong to the groups, and the monitoring module to monitor the calculated sums is arranged to made in a group specific way.

17. The system according to claim 16, wherein the explanation value of machine learning is a Shapley additive explanations (SHAP) value, a value from a local interpretable model-agnostic Explanations (LIME) method, a value from a Deep Learning Important FeaTures (deepLIFT) method.

18. The system according to claim 17, wherein the groups comprise main groups and subgroups.

19. The system according to claim 17 wherein the indication values are the explanation values or deviations of the explanation values, the deviations of the explanation values being differences between the explanation values and normal explanation values.

20. The system according to claim 19, wherein the system comprises a library module to keep the normal explanation values.

21. The system according to claim 19, wherein the groups are pre-defined.

22. The system according to claim 21, wherein the status of the group is fine when the sum is negative or relatively near to zero, and the status of the group is not fine when the sum is positive.

23. The according to claim 21, wherein the process to be monitored is a paper, board or tissue making process, and the main groups comprise one or more of production, chemistry, or towers.

24. The system according to claim 23, wherein the sub-groups comprises one or more of quality of incoming pulp(s), anionic trash in incoming pulp(s), hydrophobic contaminants in incoming pulp(s), wet end chemistry, microbial activity in wet end, anionic trash (amount or concentration of dissolved anionic compounds) in wet end, hydrophobic contaminants in wet end, retention, sizing, the quality of broke stream, hydrophobic contaminants in broke stream, anionic trash in broke stream, the quality of raw water, the quality of water circulation, grade, grammage, the amount of produced product, breaks/shutdowns of the process.

25. The system according to claim 15, wherein in that the inputs are real time values.

\* \* \* \* \*